Feb. 6, 1940.    G. G. HARRINGTON    2,189,037
REAMER
Filed Dec. 8, 1938
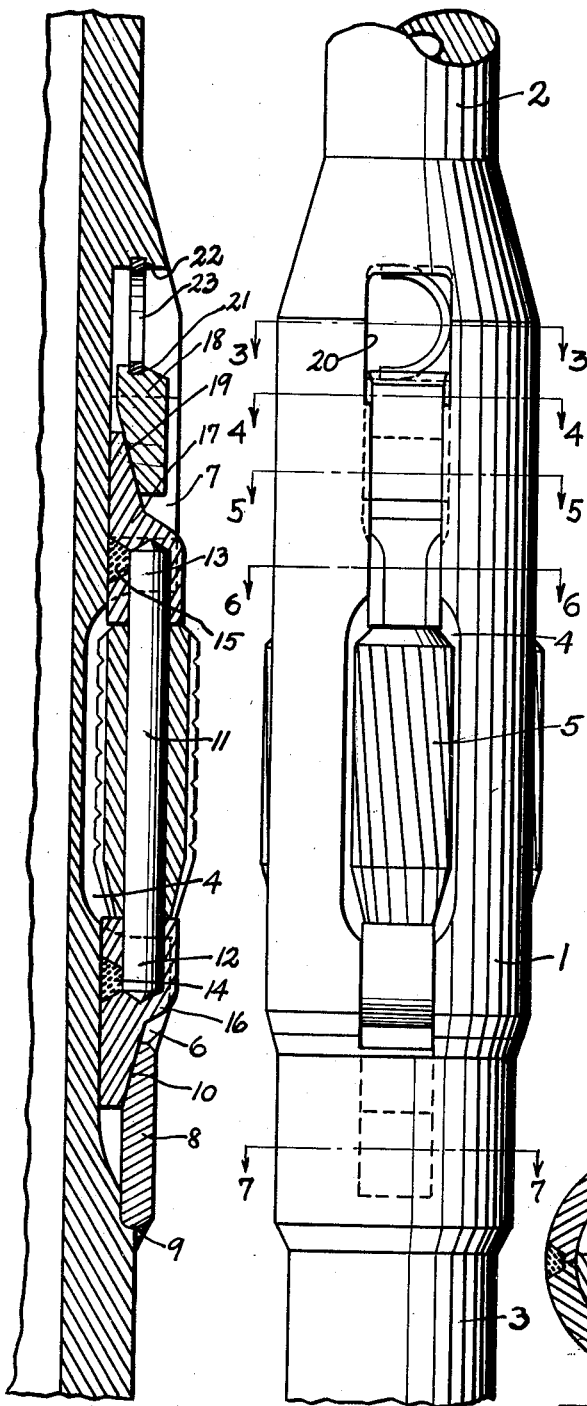
Fig.3.
Fig.4.
Fig.5.
Fig.6.
Fig.2.  Fig.1.  Fig.7.
Inventor
G.G. Harrington
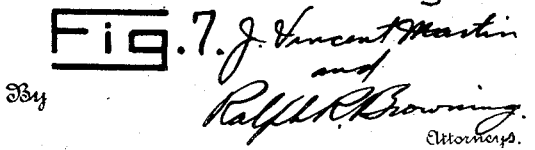
Attorneys.

Patented Feb. 6, 1940

2,189,037

UNITED STATES PATENT OFFICE 2,189,037

REAMER

George G. Harrington, Houston, Tex., assignor to Reed Roller Bit Company, Houston, Tex., a corporation of Texas Application December 8, 1938, Serial No. 244,553

8 Claims. (Cl. 255—73)

This invention relates to a reamer of that type for use in earth boring and has particular reference to that class of reamer employing roller cutters about the outside of a reamer body.

The general object of this invention is to provide a mounting for a reamer cutter on a reamer body such that the reamer cutter will not be at all times held properly positioned and will be held in such a manner that it cannot become dislodged in use.

A more specific object of this invention is to provide a mounting for such a cutter which does not have to be welded to the body.

Another object is to provide a unitary cutter assembly which may be readily inserted, secured to and detached from the body.

It is also an object of this invention to provide a relatively simple construction having a small number of movable parts and to provide a structure which will in use tend to become tighter rather than looser.

Another object is to provide such a structure which may be readily removed from a reamer body without damage to any part whatever.

Other objects and advantages of this invention will become apparent from the following description taken in connection with the accompanying drawing which illustrates by way of example one embodiment of this invention.

In the drawing:

Fig. 1 is a side elevation of a reamer constructed in accordance with this invention.

Fig. 2 is a fragmentary view of a reamer cutter in vertical cross section mounted in the reamer body in accordance with this invention.

Fig. 3 is a partial horizontal cross section taken along the line 3—3 of Fig. 1.

Fig. 4 is a similar view taken along the line 4—4 of Fig. 1.

Fig. 5 is a similar view taken along the line 5—5 of Fig. 1.

Fig. 6 is a complete horizontal cross section taken along the line 6—6 of Fig. 1.

Fig. 7 is a similar view taken along the line 7—7 of Fig. 1.

Referring more specifically to the drawing, the numeral 1 indicates a reamer body which is of larger cross section intermediate its ends than at the ends 2 and 3 thereof. Formed in the outer surface of the part of larger diameter at positions preferably equally spaced thereabout are cutter recesses 4 extending longitudinally with respect to the cutter body and adapted to receive roller cutters 5.

At the lower end of the recess 4 which may be termed a major recess there is formed a minor recess 6 and at the upper end is formed a second minor recess 7. The recess 6 is of rectangular cross section having opposite parallel sides and a ring 8 is formed in two parts as shown in Fig. 7 and welded about the reamer body overlying the auxiliary recess 6 as illustrated, the welding connection being shown at 9. At the point where it overlies the recess 6, the ring 8 is beveled along its inner surface as shown at 10 so as to form beneath the ring 8 within the recess 6 pockets which taper downwardly away from the major recess.

The upper recess 7 is of dovetail cross section, being narrower adjacent its outer than adjacent its inner edge as shown at Fig. 5.

The cutter 5 is rotatably mounted upon a shaft 11 having lower and upper ends 12 and 13 projecting therefrom. Welded to these ends 12 and 13 are shown at 14 and 15 are blocks 16 and 17, each of these blocks having tapered or wedge-shaped parts extending in a direction away from the cutter and beyond the ends of the shaft 11.

The lower of these blocks 16 extends into the recess 6 and engages the inclined surface 10 of the ring 8 so as to be wedged in place. The upper block 17 which is substantially identical with the block 16 lies within the recess 7. This block is held in place by means of a wedge block 18 having a double taper thereon. That is to say, this block is wider adjacent its inner surface than at its outer surface as illustrated in Figs. 4 and 5 of the drawing, this taper being of a nature to fit the taper of the recess 7. It is also formed with tapered surface 19 so that it tapers in a direction toward the cutter 5. This taper is of a degree to match the taper on the block 17.

The upper end of the recess 7 is formed without a taper as shown at 20 in Fig. 1 having a width such as to permit the block 18 to be inserted. The upper end of the block 18 is also formed with a transverse groove as shown at 21 and the shoulder at the upper end of the recess 7 is formed with a corresponding groove 22. A U-shaped spring member 23 is adapted to be interposed between the block 18 and the shoulder at the upper end of the recess 7 so as to constantly urge the block 18 downwardly.

In assembling the device just described, the ring 8 is first welded about the body of the reamer in such a manner as to overlie the lower ends of the recesses 6 as shown in Figs. 2 and 7. The reamer cutter 5 is then placed upon the shaft 11 and the blocks 16 and 17 are welded in place thereon by the welds shown at 14 and 15, respectively. This assembly is then placed against the reamer body with the cutter 5 in the major recess 4 and with the block 16 inserted into the recess 6 behind the ring 8. This block is driven tightly behind this ring so as to form a firm seat for the lower end of the cutter support. The block 17 is then permitted to rest within the recess 7 and the block 8 is placed within this recess through the upper part 20 thereof and slid downward. The tapered surface 19 of this block thus is caused to engage the tapered end portion of the block 17, and the block 18 is prevented from radial outward movement by virtue of its dovetail fit within the recess 7. The block 18 is then driven home so as to more tightly wedge the block 16 behind the ring 8 and so as to firmly wedge the block 17 in place behind the wedge 18. The spring 23 is then inserted into the grooves 21 and 22 and the device is ready for service.

It is thought that the means of dismantling the device will be readily apparent. The spring 23 is first removed and the block 18 hammered out of its position until it moves upwardly. When this takes place the block 16 may be driven upwardly until it leaves the position behind the ring 8 and the reamer cutter is then free from the reamer body.

It will readily be appreciated that the smallest possible number of parts has been used in the construction just set forth, and that the same is simple and would be inexpensive to manufacture.

Furthermore, when in use, due to the presence of the spring 23, each jar and jerk and each strain during the operation of the device will tend more and more to cause the mounting for the roller cutter to be firmly held and any jars and jerks, therefore, will tend to tighten rather than loosen the connection between the roller cutter and the body of the reamer.

It is further apparent that end wise thrusts upon the cutter will be taken by the wedge blocks and that the cutter will be thus positively prevented from any endwise movement. The cutter itself will be provided with the proper clearance by virtue of the fact that the blocks mounted on the ends of the cutter shaft are welded to that shaft in predetermined positions during the making up of the cutter assembly and before the cutter assembly is placed in the reamer body.

One other point of importance is that by this invention the cutter assembly is made up as a unit and may be as a unit secured to and removed from the reamer body, no welding or other permanent connection being employed between this assembly and the reamer body.

Having described my invention, I claim:

1. In a reamer, a reamer body having a major recess in the outer surface thereof and a minor recess opening into each end of said major recess, respectively, one of said recesses being of rectangular cross section and the other of said recesses being of dovetail cross section, a part overlying a portion of said one recess to form a tapered pocket opening toward said major recess, and a block in the other of said minor recesses of a cross sectional shape adapted to wedgingly fit therein, a roller cutter adapted to be mounted in said major recess, a shaft on which said cutter is rotatably mounted, and a block secured to each of the opposite ends of said shaft, one of said blocks having a tapered extension adapted to fit within said pocket and the other of said blocks having tapered extension adapted to fit within said dovetail recess and wedgingly receive the first mentioned block fitting within said recess, and means for resiliently urging said first mentioned block into wedging engagement with said second block which is secured to said shaft to firmly anchor said second block and to resiliently urge the block fitting within said pocket into wedging engagement therewith.

2. In a reamer, a reamer body having a major recess in the outer surface thereof and a minor recess opening into each end of said major recess, respectively, one of said minor recesses being of rectangular cross section and the other of said minor recesses being of dovetail cross section, a part overlying a portion of said one recess to form a tapered pocket opening toward said major recess, and a block in the other of said minor recesses of a cross sectional shape adapted to wedgingly fit therein, a roller cutter adapted to be mounted in said major recess, a shaft on which said cutter is rotatably mounted, and a block secured to each of the opposite ends of said shaft, each of said blocks having a tapered extension, one adapted to fit within said pocket and the other adapted to fit within said dovetail recess and wedgingly receive the first mentioned block fitting within said recess, and means for resiliently urging said first mentioned block into wedging engagement with said last mentioned block to firmly anchor the same.

3. In a reamer, a reamer body having a major recess in the outer surface thereof and a minor recess opening into each end of said major recess, respectively, one of said minor recesses being in the form of a pocket opening toward said major recess and the other of said minor recesses providing a longitudinal outwardly tapered slideway and a wedge block having a tapered inner face and adapted to slide in said slideway, a roller cutter adapted to be mounted in said major recess, a shaft on which said cutter is rotatably mounted, and a block secured to each of the opposite ends of said shaft, each of said blocks on the shaft having a tapered extension, one adapted to fit within said pocket and the other adapted to fit within said second minor recess and wedgingly engage the first mentioned block fitting within said recess, and means for resiliently urging said first mentioned block into wedging engagement with said other block on the shaft to firmly anchor said second block.

4. In a reamer, a reamer body having a major recess in the outer surface thereof and a minor recess opening into each end of said major recess, respectively, one of said minor recesses being in the form of a pocket opening only toward said major recess, a roller cutter adapted to be mounted in said major recess, a shaft on which said cutter is rotatably mounted, and a block secured to each of the opposite ends of said shaft, each of said blocks having a part, one adapted to wedgingly fit within said pocket and the other adapted to fit within said second minor recess, means for holding said other block within said second minor recess, and means for continuously urging said holding means into active position.

5. In a reamer, a reamer body having a major recess in the outer surface thereof and a minor recess opening into each end of said major recess, respectively, one of said recesses being of rectangular cross section and the other of said recesses being of dovetail cross section, a part overlying a portion of said one recess to form a tapered pocket opening towards said major recess and a block in the end of said minor recess of a cross section of proper shape to wedgingly fit therein, a roller cutter adapted to be mounted in said major recess, a shaft on which said cutter is rotatably mounted, and a block secured to each of the opposite ends of said shaft, one of said blocks having a tapered extension adapted to fit within said pocket, and the other of said blocks having a tapered extension to fit within said dovetail recess and wedgingly receive the first mentioned block fitted within said recess, said recess having an abutment therein, and a U-shaped resilient member between said abutment and said first mentioned block for continuously urging said first mentioned block into wedging engagement with said last mentioned block to firmly anchor said last mentioned block.

6. In a reamer, a reamer body having a major recess in the outer surface thereof and a pocket adjacent one end of said major recess, an outwardly tapered slideway adjacent the other end of said major recess, a block longitudinally slidably mounted within said slideway, a roller cutter adapted to be mounted in said major recess, a shaft on which said cutter is rotatably mounted, and a block on each end of said shaft, one of said blocks having a part adapted to fit within said pocket, and the other of said blocks having a part adapted to be wedgingly engaged by said sliding block when the same is moved in said slideway in one direction to hold said other block rigid with respect to said body, and means for resiliently urging said sliding block into said wedging engagement.

7. In a reamer, a reamer body having a major recess in the outer surface thereof and a pocket adjacent one end of said major recess, an outwardly tapered slideway adjacent the other end of said major recess, a block longitudinally slidably mounted within said slideway, a roller cutter adapted to be mounted in said major recess, a shaft on which said cutter is rotatably mounted, and a block on each end of said shaft, one of said blocks having a part adapted to fit within said pocket, and the other of said blocks having a part adapted to be wedgingly engaged by said slidable block when the same is moved in said slideway in one direction to hold said other block rigid with respect to said body.

8. In a reamer, a reamer body having a major recess in the outer surface thereof and a minor recess opening into each end of said major recess, respectively, one of said minor recesses being of dovetail cross-section, a block in said minor recess of a cross-sectional shape adapted to wedgingly fit therein, a roller cutter adapted to be mounted in said major recess, a shaft on which said cutter is rotatably mounted, means securing said shaft in the other of said minor recesses, a block secured to the opposite end of said shaft, said block having a tapered extension adapted to fit within said dovetail recess and wedgingly receive said first mentioned block fitting within said recess, and means for resiliently urging said first mentioned block into wedging engagement with said second block which is secured to said shaft to firmly anchor said second block.

GEORGE G. HARRINGTON.